(12) United States Patent
Ninomiya et al.

(10) Patent No.: US 7,864,277 B2
(45) Date of Patent: Jan. 4, 2011

(54) LIQUID CRYSTAL DEVICE AND PROJECTOR

(75) Inventors: Takanori Ninomiya, Suwa-gun (JP); Hiromi Saito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 12/389,657

(22) Filed: Feb. 20, 2009

(65) Prior Publication Data
US 2009/0231499 A1  Sep. 17, 2009

(30) Foreign Application Priority Data
Mar. 14, 2008  (JP) .............................. 2008-066691

(51) Int. Cl.
*G02F 1/1335* (2006.01)
(52) U.S. Cl. ..................... 349/117; 349/56; 349/74; 349/75; 349/84
(58) Field of Classification Search .............. 349/56, 349/74, 75, 84, 117
See application file for complete search history.

(56) References Cited

U.S. PATENT DOCUMENTS 6,867,830 B1 *  3/2005  Hirota et al. ................. 349/96
2005/0264720 A1 * 12/2005  Itou et al. ..................... 349/99

FOREIGN PATENT DOCUMENTS

JP  2004-102200  4/2004
JP  2006-119444  5/2006

* cited by examiner

*Primary Examiner*—Jennifer Doan
(74) *Attorney, Agent, or Firm*—AdvantEdge Law Group, LLC

(57) ABSTRACT

A liquid crystal device includes a liquid crystal panel, a pair of polarizers and a phase plate. The phase plate is formed by a supply direction of an inorganic material to the substrate surface set such that a ratio of a front phase difference, which is produced when light is incident along a normal direction of the phase plate, and a first phase difference, which is produced when light is incident along a first direction different from the normal direction, falls within a predetermined range.

6 Claims, 10 Drawing Sheets

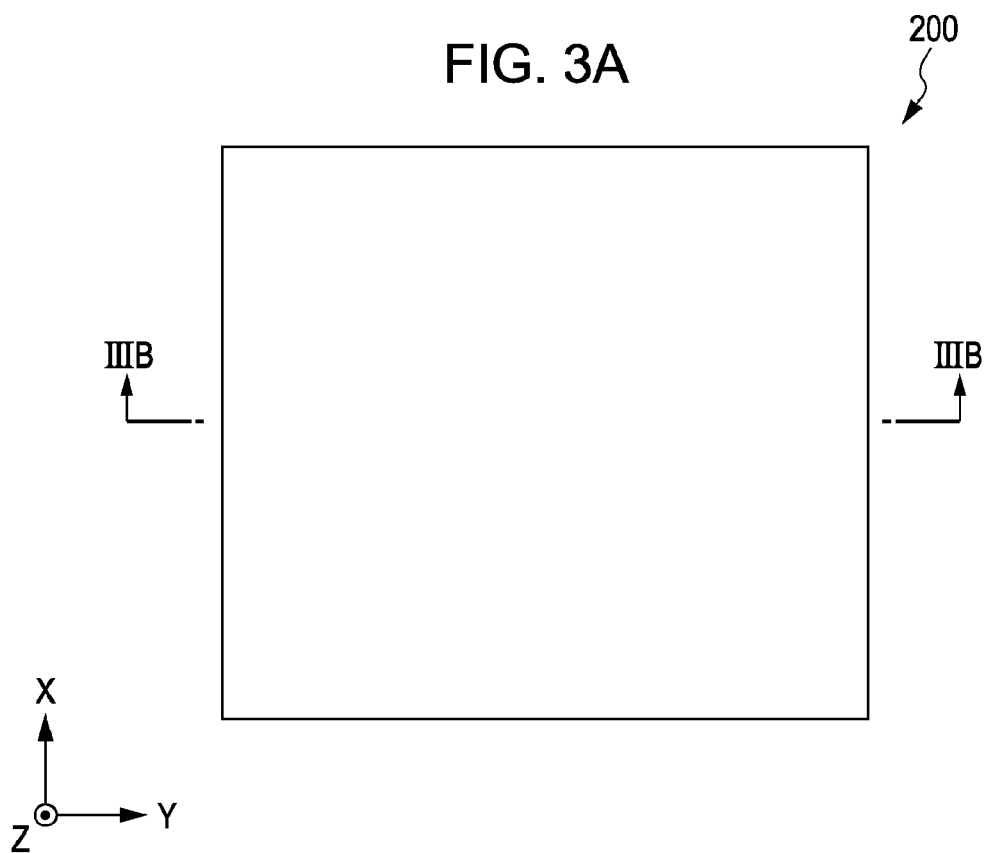
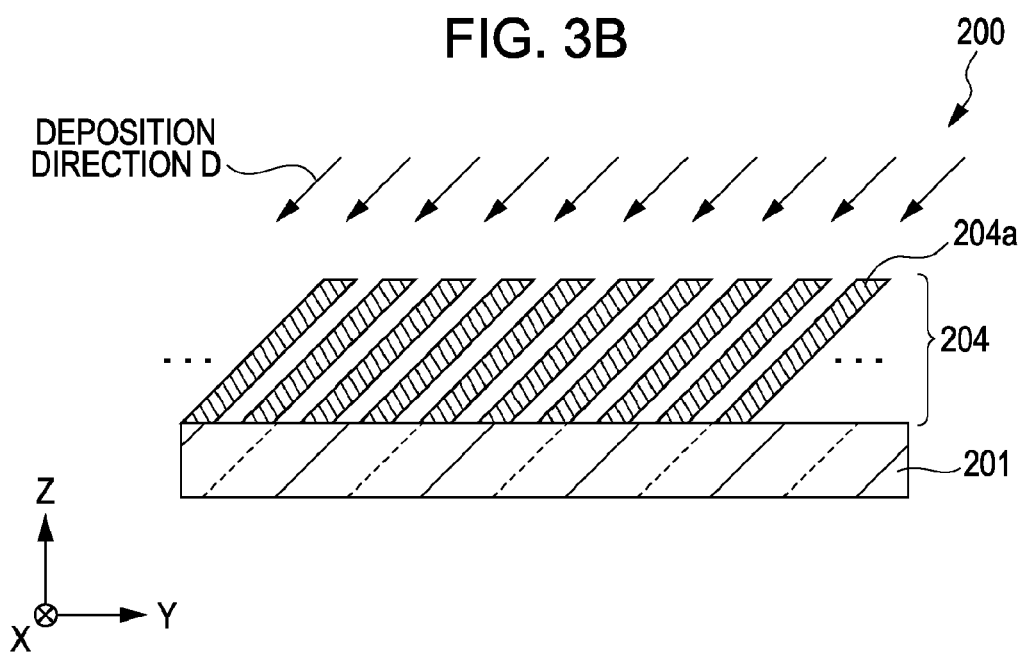

FIG. 5A

Ret(0) = 10 nm

| TYPE | R[a] | R[b] | R[c] | R[d] |
|---|---|---|---|---|
| 1a | 1.6 | 0.1 | 11.8 | 0.1 |
| 2a | 1.4 | 0.3 | 4.4 | 0.2 |
| 3a | 1.3 | 0.4 | 2.9 | 0.3 |
| 4a | 1.2 | 0.6 | 2.0 | 0.5 |
| 5a | 1.1 | 0.7 | 1.5 | 0.7 |

DEPOSITION ANGLE: LARGE → SMALL

FIG. 5B

Ret(0) = 20 nm

| TYPE | R[a] | R[b] | R[c] | R[d] |
|---|---|---|---|---|
| 6a | 1.6 | 0.1 | 11.8 | 0.1 |
| 7a | 1.4 | 0.3 | 4.4 | 0.2 |
| 8a | 1.3 | 0.4 | 2.9 | 0.3 |
| 9a | 1.2 | 0.6 | 2.0 | 0.5 |
| 10a | 1.1 | 0.7 | 1.5 | 0.7 |

FIG. 5C

Ret(0) = 30 nm

| TYPE | R[a] | R[b] | R[c] | R[d] |
|---|---|---|---|---|
| 11a | 1.6 | 0.1 | 11.8 | 0.1 |
| 12a | 1.4 | 0.3 | 4.4 | 0.2 |
| 13a | 1.3 | 0.4 | 2.9 | 0.3 |
| 14a | 1.2 | 0.6 | 2.0 | 0.5 |
| 15a | 1.1 | 0.7 | 1.5 | 0.7 |

FIG. 5D

Ret(0) = 40 nm

| TYPE | R[a] | R[b] | R[c] | R[d] |
|---|---|---|---|---|
| 16a | 1.6 | 0.1 | 11.8 | 0.1 |
| 17a | 1.4 | 0.3 | 4.4 | 0.2 |
| 18a | 1.3 | 0.4 | 2.9 | 0.3 |
| 19a | 1.2 | 0.6 | 2.0 | 0.5 |
| 20a | 1.1 | 0.7 | 1.5 | 0.7 |

FIG. 5E

Ret(0) = 50 nm

| TYPE | R[a] | R[b] | R[c] | R[d] |
|---|---|---|---|---|
| 21a | 1.6 | 0.1 | 11.8 | 0.1 |
| 22a | 1.4 | 0.3 | 4.4 | 0.2 |
| 23a | 1.3 | 0.4 | 2.9 | 0.3 |
| 24a | 1.2 | 0.6 | 2.0 | 0.5 |
| 25a | 1.1 | 0.7 | 1.5 | 0.7 |

FIG. 5F

Ret(0) = 60 nm

| TYPE | R[a] | R[b] | R[c] | R[d] |
|---|---|---|---|---|
| 26a | 1.6 | 0.1 | 11.8 | 0.1 |
| 27a | 1.4 | 0.3 | 4.4 | 0.2 |
| 28a | 1.3 | 0.4 | 2.9 | 0.3 |
| 29a | 1.2 | 0.6 | 2.0 | 0.5 |
| 30a | 1.1 | 0.7 | 1.5 | 0.7 |

FIG. 5G

Ret(0) = 70 nm

| TYPE | R[a] | R[b] | R[c] | R[d] |
|---|---|---|---|---|
| 31a | 1.6 | 0.1 | 11.8 | 0.1 |
| 32a | 1.4 | 0.3 | 4.4 | 0.2 |
| 33a | 1.3 | 0.4 | 2.9 | 0.3 |
| 34a | 1.2 | 0.6 | 2.0 | 0.5 |
| 35a | 1.1 | 0.7 | 1.5 | 0.7 |

FIG. 5H

Ret(0) = 80 nm

| TYPE | R[a] | R[b] | R[c] | R[d] |
|---|---|---|---|---|
| 36a | 1.6 | 0.1 | 11.8 | 0.1 |
| 37a | 1.4 | 0.3 | 4.4 | 0.2 |
| 38a | 1.3 | 0.4 | 2.9 | 0.3 |
| 39a | 1.2 | 0.6 | 2.0 | 0.5 |
| 40a | 1.1 | 0.7 | 1.5 | 0.7 |

FIG. 5I

Ret(0) = 90 nm

| TYPE | R[a] | R[b] | R[c] | R[d] |
|---|---|---|---|---|
| 41a | 1.6 | 0.1 | 11.8 | 0.1 |
| 42a | 1.4 | 0.3 | 4.4 | 0.2 |
| 43a | 1.3 | 0.4 | 2.9 | 0.3 |
| 44a | 1.2 | 0.6 | 2.0 | 0.5 |
| 45a | 1.1 | 0.7 | 1.5 | 0.7 |

FIG. 5J

Ret(0) = 100 nm

| TYPE | R[a] | R[b] | R[c] | R[d] |
|---|---|---|---|---|
| 46a | 1.6 | 0.1 | 11.8 | 0.1 |
| 47a | 1.4 | 0.3 | 4.4 | 0.2 |
| 48a | 1.3 | 0.4 | 2.9 | 0.3 |
| 49a | 1.2 | 0.6 | 2.0 | 0.5 |
| 50a | 1.1 | 0.7 | 1.5 | 0.7 |

FIG. 8

| Ret(0): (nm) | R[a] | R[b] | R[c] | R[d] |
|---|---|---|---|---|
| 20 | 1.6 | 0.1 | 11.8 | 0.1 |
| 30 | 1.3 TO 1.6 | 0.1 TO 0.4 | 2.9 TO 11.8 | 0.1 TO 0.3 |
| 40 | 1.2 TO 1.6 | 0.1 TO 0.6 | 2.0 TO 11.8 | 0.1 TO 0.5 |
| 50 | 1.2 TO 1.4 | 0.3 TO 0.6 | 2.0 TO 4.4 | 0.2 TO 0.5 |
| 60 | 1.2 TO 1.4 | 0.3 TO 0.6 | 2.0 TO 4.4 | 0.2 TO 0.5 |
| 70 | 1.2 TO 1.3 | 0.4 TO 0.6 | 2.0 TO 2.9 | 0.3 TO 0.5 |
| 80 | 1.2 | 0.6 | 2.0 | 0.5 |

LIQUID CRYSTAL DEVICE AND PROJECTOR

BACKGROUND

1. Technical Field

The present invention relates to a liquid crystal device including a polarizer and a phase plate, a projector including a liquid crystal device, and a phase plate for a liquid crystal device.

2. Related Art

As a phase plate for a liquid crystal device, a phase plate is known in which an inorganic film is formed on a substrate by oblique deposition so as to be resistant to light, as compared with an organic film, thereby achieving high lightfastness, (for example, see JP-A-2004-102200 and JP-A-2006-119444).

However, according to the technology disclosed in JP-A-2004-102200 and JP-A-2006-119444, it is technically difficult to sufficiently improve contrast in the liquid crystal device by a phase plate in which the inorganic film is formed by oblique deposition.

SUMMARY

An advantage of some aspects of the invention is that it provides a liquid crystal device, which can improve contrast with higher accuracy, a projector including liquid crystal device, and a phase plate for a liquid crystal device.

(Liquid Crystal Device)

According to a first aspect of the invention, a liquid crystal device includes a liquid crystal panel that has a pair of substrates with liquid crystal interposed therebetween and modulates light, a pair of polarizers that are disposed with the liquid crystal panel interposed therebetween, and a phase plate that is disposed between the pair of polarizers, and has a first substrate and an inorganic film formed on the first substrate, the inorganic film being formed by supplying an inorganic material obliquely with respect to a surface of the first substrate. A supply direction of the inorganic material to the substrate surface is set such that a ratio of a front phase difference, which is produced when light is incident along a normal direction of the phase plate, and a first phase difference, which is produced when light is incident along a first direction different from the normal direction, falls within a predetermined range.

With this liquid crystal device, light emitted from the light source is separated into a red light component, a green light component, and a blue light component by a color separation optical system including a reflection mirror, a dichroic mirror, and the like. The liquid crystal panel is used as a light valve, which modulates each of the red light component, the green light component, and the blue light component. In the liquid crystal panel, for example, the alignment state of liquid crystal molecules of each pixel is changed in accordance with a data signal (or an image signal), and an image is displayed on the basis of the data signal in a display region through a polarizer. The image displayed by each liquid crystal panel is synthesized by a color synthesis optical system, such as a dichroic prism or the like, and a projection image is projected onto a projection surface, such as a screen, through a projection lens.

The liquid crystal panel has a pair of substrates with liquid crystal interposed therebetween. Typically, liquid crystal is liquid crystal in which liquid crystal molecules whose alignment (or alignment state) is regulated by an alignment film are twisted between a pair of substrates in a direction parallel to the substrate surface. In addition, twisted nematic (TN) liquid crystal in which the major axis direction of one liquid crystal molecule whose alignment is regulated by one alignment film and the major axis direction of the other liquid crystal molecule whose alignment is regulated by the other alignment film are twisted at 90° may be used. Alternatively, super twisted nematic (STN) liquid crystal or DSTN liquid crystal in which the major axis direction of one liquid crystal molecule and the major axis direction of the other liquid crystal molecule are twisted at 270° may be used. When no voltage is applied to the liquid crystal panel, the liquid crystal molecules are maintained at positions along a planar direction of each substrate of the liquid crystal panel. Meanwhile, when a voltage is applied to the liquid crystal panel, the liquid crystal molecules are tilted so as to be close to the normal direction of each substrate of the liquid crystal panel. Therefore, normally white mode or normally black mode liquid crystal can be simply implemented.

Furthermore, liquid crystal may be VA (Vertical Alignment) liquid crystal. An alignment film is provided in each of a pair of substrates, and the liquid crystal molecules constituting liquid crystal are pretilted in a predetermined direction at a predetermined angle by the alignment film. For example, when liquid crystal is VA liquid crystal, the liquid crystal molecules are tilted in a predetermined direction at a pretilt angle so as to be normal to the surface of each of a pair of substrates. When no voltage is applied to the liquid crystal panel, the liquid crystal molecules are maintained to be pretilted. Meanwhile, when a voltage is applied to the liquid crystal panel, the liquid crystal molecules are tilted so as to be close to the planar direction of each substrate of the liquid crystal panel. Therefore, VA liquid crystal or normally black mode liquid crystal can be simply implemented. As viewed from the normal direction of a pair of substrates, the major axis of the pretilted liquid crystal molecules and one side of a pair of substrates may meet at 45°. The liquid crystal panel and the phase plate are disposed so as to be interposed between a pair of polarizers.

The phase plate has the first substrate, and the inorganic film formed on the first substrate, the inorganic film being formed by supplying the inorganic material obliquely with respect to the substrate surface of the first substrate. The inorganic film is formed on the substrate surface by supplying an inorganic material, such as $Ta_2O_5$, obliquely with respect to the substrate surface of each substrate. More specifically, as a method of forming an inorganic film, for example, oblique deposition or sputtering, in which an inorganic material is supplied obliquely in the form of atoms, may be used. When viewed microscopically, the inorganic film has a film structure in which an inorganic material is grown obliquely. With this inorganic film, anisotropy is produced in the refraction index in accordance with the film structure of the inorganic film, and thus the phase of light incident on the phase plate can be compensated.

In particular, the supply direction of the inorganic material to the substrate surface is set such that the ratio of the front phase difference, which is produced when light is incident along the normal direction of the phase plate, and the first phase difference, which is produced when light is incident along the first direction different from the normal direction, falls within the predetermined range. The predetermined range used herein means an allowable range of the ratio of the front phase difference and the first phase difference which is individually and specifically defined theoretically, experimentally, experientially, or according to a simulation such that the contrast of light emitted from the liquid crystal device is increased. The first direction used herein means a direction different from the normal direction of the phase plate. Typically, the first direction may mean a polar angle which represents an angle of a visual axis when the direct view of the phase plate is set to 0°.

As a result, by appropriately changing the value of the front phase difference, the value of the ratio between the front phase difference and the first phase difference, and the angle of the oblique supply direction of the inorganic material, a phase plate capable of improving the contrast of the liquid crystal device can be simply implemented. In other words, by setting various variables or parameters for defining the characteristics of the phase plate, the contrast of the liquid crystal device can be improved with higher accuracy.

As a result, in the liquid crystal device, the phase plate can cancel (that is, compensate) the phase difference (in other words, birefringence effect) between the liquid crystal molecules. Thus, when the liquid crystal device is in operation, the phase difference of light which is produced when light emitted from the light source passes through liquid crystal can be compensated by the phase plate. Therefore, light which passes through the liquid crystal panel can be prevented from entering an outgoing-side polarizer with the phase shifted. As a result, there is little possibility that light, which does not originally transmit the outgoing-side polarizer, leaks from the outgoing-side polarizer, and thus the contrast or viewing angle can be prevented from being deteriorated or reduced.

According to a second aspect of the invention, a liquid crystal device includes a liquid crystal panel that has a pair of substrates with liquid crystal interposed therebetween and modulates light, a pair of polarizers that are disposed with the liquid crystal panel interposed therebetween, and a phase plate that is disposed between the pair of polarizers, and has a first substrate and an inorganic film formed on the first substrate, the inorganic film being formed by supplying an inorganic material obliquely with respect to a surface of the first substrate. A supply direction of the inorganic material to the substrate surface is set such that a ratio of a first phase difference, which is produced when light is incident along a first direction different from a normal direction of the phase plate, and a second phase difference, which is produced when light is incident along a second direction symmetric with respect to the first direction on the basis of the normal direction, falls within a predetermined range.

With this liquid crystal device, the supply direction of the inorganic material to the substrate surface is set such that the ratio of the first phase difference, which is produced when light is incident along the first direction different from the normal direction of the phase plate, and the second phase difference, which is produced when light is incident along the second direction symmetric with respect to the first direction on the basis of the normal direction, falls within the predetermined range. The predetermined range used herein means an allowable range of the ratio of the first phase difference and the second phase difference which is individually and specifically defined theoretically, experimentally, experientially, or according to a simulation such that the contrast of light emitted from the liquid crystal device is increased.

As a result, by appropriately changing the value of the ratio of the first phase difference and the second phase difference and the angle of the oblique supply direction of the inorganic material, a phase plate capable of improving the contrast of the liquid crystal device can be simply implemented. In other words, by setting various variables or parameters for defining the characteristics of the phase plate, the contrast of the liquid crystal device can be improved with higher accuracy.

As a result, in the liquid crystal device, the phase plate can cancel (that is, compensate) the phase difference (in other words, birefringence effect) between the liquid crystal molecules. Thus, when the liquid crystal device is in operation, the phase difference of light which is produced when light emitted from the light source passes through liquid crystal can be compensated by the phase plate. Therefore, light which passes through the liquid crystal panel can be prevented from entering an outgoing-side polarizer with the phase shifted. As a result, there is little possibility that light, which does not originally transmit the outgoing-side polarizer, leaks from the outgoing-side polarizer, and thus the contrast or viewing angle can be prevented from being deteriorated or reduced.

In particular, with this liquid crystal device, with respect to the variation of the ratio, the ratio of the first phase difference and the second phase difference can be increased, as compared with the ratio of the front phase difference and the first phase difference. Therefore, a phase plate capable of increasing the allowable range of the ratio and improving the contrast can be simply manufactured in terms of quality management.

In the liquid crystal device according to the first or second aspect of the invention, the first direction and the supply direction of the inorganic material may be present on the same plane.

With this configuration, the deposition angle when the inorganic material is deposited obliquely can be set so as to be parallel to the polar angle representing the angle of the visual axis when the direct view of the phase plate is set to 0°. Therefore, when the deposition angle and the polar angle are set to be identical, the degree of improvement of the contrast in the liquid crystal device can be grasped in accordance with the phase difference of the inorganic material itself.

In the liquid crystal device according to the first or second aspect of the invention, the predetermined range may be determined in accordance with the front phase difference, which is produced when light is incident along the normal direction of the phase plate.

With this configuration, the predetermined range can be defined on the basis of the front phase difference with high accuracy.

In the liquid crystal device according to the first or second aspect of the invention, the phase plate may be provided so as to be rotatable around the normal direction.

With this configuration, when the phase plate is assembled with the liquid crystal device, by rotating the phase plate around a direction in which light is incident, the contrast to be implemented can be set with high accuracy.

(Projector)

According to a third aspect of the invention, a projector includes the above-described liquid crystal device (including various examples), a light source that emits light, and a projection optical system that projects modulated light.

With this projector, light emitted from the light source is separated into a red light component, a green light component, and a blue light component by a color separation optical system including a reflection mirror, a dichroic mirror, and the like. The above-described liquid crystal panel is used as a light valve that modulates the red light component, the green light component, or the blue light component. In the liquid crystal panel, for example, the alignment state of liquid crystal molecules of each pixel is regulated in accordance with a data signal (or an image signal), and an image according to the data signal is displayed in the display region of the liquid crystal device.

The image displayed by each liquid crystal panel is synthesized by a color synthesis optical system, such as a dichroic prism, in the projection optical system, and a projection image is projected onto a projection surface, such as a screen, through a projection lens.

Similarly to the liquid crystal device of the invention, by appropriately changing the value of the front phase difference, the value of the ratio of the front phase difference and the first phase difference, and the angle of the oblique supply direction of the inorganic material, a phase plate capable of improving the contrast of the liquid crystal device can be simply implemented. In other words, by setting various variables or parameters for defining the characteristics of the phase plate, the contrast of the projector can be improved with higher accuracy.

As a result, in the projector, the phase plate can cancel (that is, compensate) the phase difference (in other words, birefringence effect) between the liquid crystal molecules. Thus, when the projector is in operation, the phase difference of light which is produced when light emitted from the light source passes through liquid crystal can be compensated by the phase plate. Therefore, light which passes through the liquid crystal panel can be prevented from entering an outgoing-side polarizer with the phase shifted. As a result, there is little possibility that light, which does not originally transmit the outgoing-side polarizer, leaks from the outgoing-side polarizer, and thus the contrast or viewing angle can be prevented from being deteriorated or reduced.

As a result, in the projector of the invention, high-quality display can be performed with high contrast.

In the projector of the invention, various examples of the liquid crystal device described above can be appropriately adopted.

(Phase Plate)

According to a fourth aspect of the invention, there is provided a phase plate that is used together with a liquid crystal panel that has a pair of substrates with liquid crystal interposed therebetween and modulates light, and a pair of polarizers that are disposed with the liquid crystal panel interposed therebetween, and is disposed between the pair of polarizers. The phase plate include a first substrate and an inorganic film formed on the first substrate, the inorganic film being formed by supplying an inorganic material obliquely with respect to a surface of the first substrate. A supply direction of the inorganic material to the substrate surface is set such that a ratio of a front phase difference, which is produced when light is incident along a normal direction of the phase plate, and a first phase difference, which is produced when light is incident along a first direction different from the normal direction, falls within a predetermined range.

With this phase plate, similarly to the liquid crystal device according to the first aspect of the invention, by appropriately changing the value of the front phase difference, the value of the ratio of the front phase difference and the first phase difference, and the angle of the oblique supply direction of the inorganic material, a phase plate capable of improving the contrast of the liquid crystal device can be simply implemented. In other words, by setting various variables or parameters for defining the characteristics of the phase plate, the contrast of the liquid crystal device can be improved with higher accuracy.

As a result, in the liquid crystal device, the phase plate can cancel (that is, compensate) the phase difference (in other words, birefringence effect) between the liquid crystal molecules. Thus, when the liquid crystal device is in operation, the phase difference of light which is produced when light emitted from the light source passes through liquid crystal can be compensated by the phase plate. Therefore, light which passes through the liquid crystal panel can be prevented from entering an outgoing-side polarizer with the phase shifted. As a result, there is little possibility that light, which does not originally transmit the outgoing-side polarizer, leaks from the outgoing-side polarizer, and thus the contrast or viewing angle can be prevented from being deteriorated or reduced.

In the phase plate according to the fourth aspect of the invention, the same examples as various examples of the liquid crystal device according to the first aspect of the invention can be appropriately adopted.

According to a fifth aspect of the invention, there is provided a phase plate that is used together with a liquid crystal panel that has a pair of substrates with liquid crystal interposed therebetween and modulates light, and a pair of polarizers that are disposed with the liquid crystal panel interposed therebetween, and is disposed between the pair of polarizers. The phase plate includes a first substrate, and an inorganic film formed on the first substrate, the inorganic film being formed by supplying an inorganic material obliquely with respect to a surface of the first substrate. A supply direction of the inorganic material to the substrate surface is set such that a ratio of a first phase difference, which is produced when light is incident along a first direction different from a normal direction of the phase plate, and a second phase difference, which is produced when light is incident along a second direction symmetric with respect to the first direction on the basis of the normal direction, falls within a predetermined range.

With this phase plate, similarly to the liquid crystal device according to the second aspect of the invention, by appropriately changing the value of the ratio of the first phase difference and the second phase difference and the angle of the oblique supply direction of the inorganic material, a phase plate capable of improving the contrast of the liquid crystal device can be simply implemented. In other words, by setting various variables or parameters for defining the characteristics of the phase plate, the contrast of the liquid crystal device can be improved with higher accuracy.

As a result, in the liquid crystal device, the phase plate can cancel (that is, compensate) the phase difference (in other words, birefringence effect) between the liquid crystal molecules. Thus, when the liquid crystal device is in operation, the phase difference of light which is produced when light emitted from the light source passes through liquid crystal can be compensated by the phase plate. Therefore, light which passes through the liquid crystal panel can be prevented from entering an outgoing-side polarizer with the phase shifted. As a result, there is little possibility that light, which does not originally transmit the outgoing-side polarizer, leaks from the outgoing-side polarizer, and thus the contrast or viewing angle can be prevented from being deteriorated or reduced.

In particular, with this to the phase plate, with respect to the variation of the ratio, the ratio of the first phase difference and the second phase difference can be increased, as compared with the ratio of the front phase difference and the first phase difference. Therefore, a phase plate capable of increasing the allowable range of the ratio and improving the contrast can be simply manufactured in terms of quality management.

In the phase plate according to the fifth aspect of the invention, the same examples as various examples of the liquid crystal device according to the second aspect of the invention can be appropriately adopted.

The operations and other advantages of the invention will be apparent from an embodiment described below.

BRIEF DESCRIPTION OF THE DRAWINGS

The invention will be described with reference to the accompanying drawings, wherein like numbers reference like elements.

FIG. 3A is a plan view of a phase plate according to this embodiment.

FIG. 3B is an enlarged sectional view taken along the line IIIB-IIIB of FIG. 3A.

FIGS. 5A to 5J are tables showing the quantitative correlationship between a front phase difference, a deposition angle, and a ratio of a phase different in a phase plate according to this embodiment.

FIG. 8 is a table showing the correlationship between a front phase difference and the values of first to fourth ratio types R[a] to R[d] corresponding to the front phase difference in a phase plate of this embodiment, which can improve contrast so as to be larger than a predetermined value.

DESCRIPTION OF EXEMPLARY EMBODIMENTS

Embodiment

Figure 1:
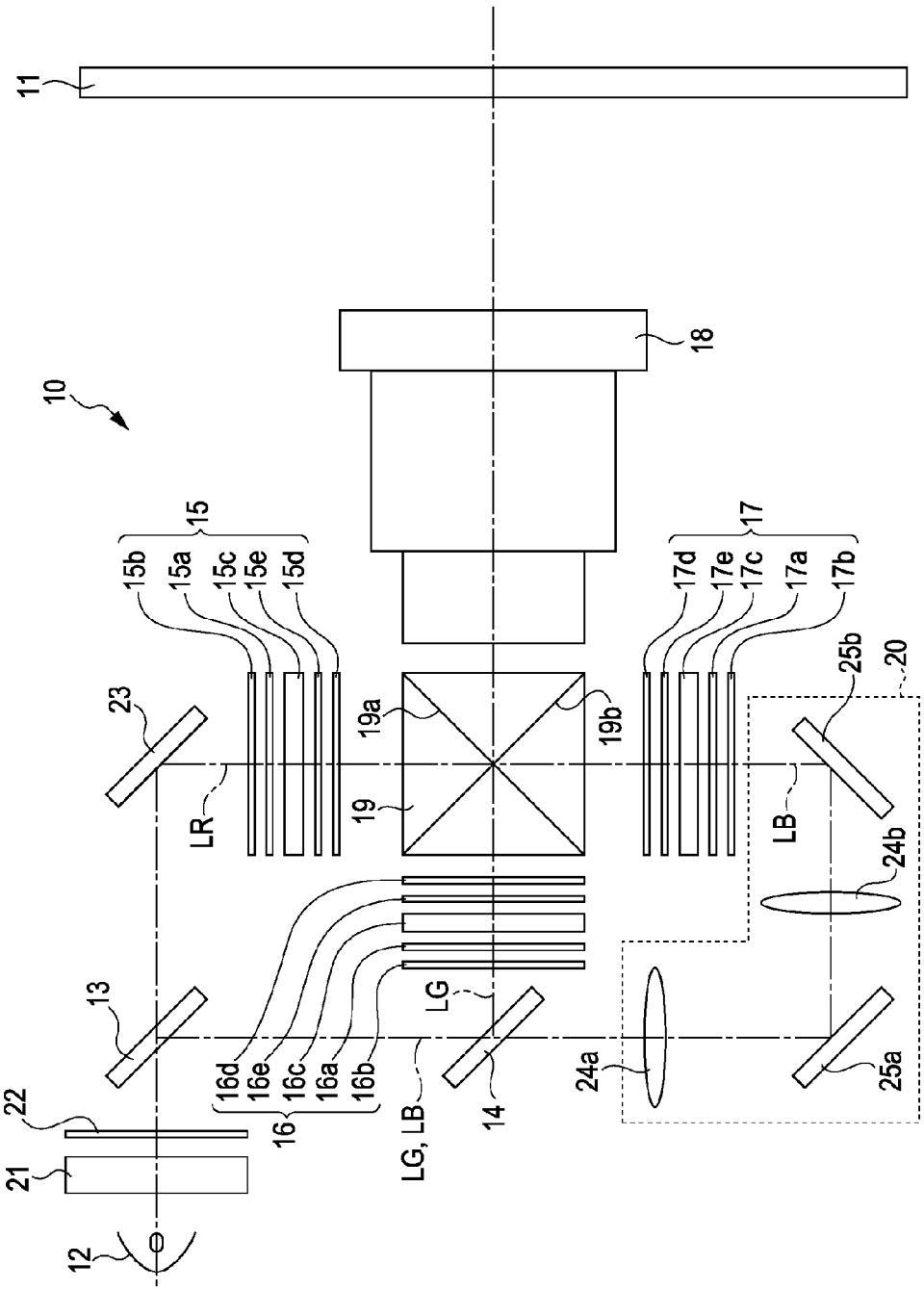
FIG. 1 is a schematic configuration diagram of a liquid crystal projector according to an embodiment of the invention.

FIG. 1 is a schematic configuration diagram of a liquid crystal projector according to an embodiment of the invention. A projector 10 is a forward projection-type projector that projects an image onto a screen 11 provided in front. The projector 10 includes a light source 12, dichroic mirrors 13 and 14, liquid crystal light valves 15 to 17, a projection optical system 18, a cross dichroic prism 19, and a relay system 20.

The light source 12 includes an extra-high pressure mercury lamp that emits light including red, green, and blue light components. The dichroic mirror 13 transmits a red light component LR from the light source 12, and reflects a green light component LG and a blue light component LB. The dichroic mirror 14 transmits the blue light component LB from among the green light component LG and the blue light component LB reflected by the dichroic mirror 13, and reflects the green light component LG. The dichroic mirrors 13 and 14 form a color separation optical system that separates light emitted from the light source 12 into the red light component LR, the green light component LG, and the blue light component LB. An integrator 21 and a polarization conversion element 22 are disposed between the dichroic mirror 13 and the light source 12 in this order from the light source 12. The integrator 21 uniformizes the illumination distribution of light emitted from the light source 12. The polarization conversion element 22 converts light from the light source 12 into polarized light having a specific vibration direction, such as s-polarized light.

The liquid crystal light valve 15 is a transmissive liquid crystal device (electro-optical device) that modulates the red light component LR transmitted the dichroic mirror 13 and reflected by a reflection mirror 23 in accordance with an image signal. The liquid crystal light valve 15 includes a first polarizer 15b, a first phase plate 15a, a liquid crystal panel 15c, a second phase plate 15e, and a second polarizer 15d. Specifically, the liquid crystal light valve 15 includes the above-described liquid crystal panel 15c, the first phase plate 15a that is disposed outward of a counter substrate 31 of the liquid crystal panel 15c, the first polarizer 15b that is disposed outward of the first phase plate 15a, the second phase plate 15e that is disposed outward of a TFT array substrate 32 of the liquid crystal panel 15c, and the second polarizer 15d that is disposed outward of the second phase plate 15e.

The red light component LR incident on the liquid crystal light valve 15 transmits the first polarizer 15b and is converted into s-polarized light, for example. The liquid crystal panel 15c modulates incident s-polarized light in accordance with an image signal so as to convert s-polarized light into p-polarized light (when halftone, circularly polarized light or elliptically polarized light). The second polarizer 15d is a polarizer that blocks s-polarized light and transmits p-polarized light. Therefore, the liquid crystal light valve 15 modulates the red light component LR in accordance with an image signal, and emits the modulated red light component LR toward the cross dichroic prism 19.

The liquid crystal light valve 16 is a transmissive liquid crystal device that modulates the green light component LG, which is reflected by the dichroic mirror 13 and then reflected by the dichroic mirror 14, in accordance with an image signal, and emits the modulated green light component LG toward the cross dichroic prism 19. Similarly to the liquid crystal light valve 15, the liquid crystal light valve 16 includes a first polarizer 16b, a first phase plate 16a, a liquid crystal panel 16c, a second phase plate 16e, and a second polarizer 16d.

The liquid crystal light valve 17 is a transmissive liquid crystal device that modulates the blue light component LB, which is reflected by the dichroic mirror 13, transmits the dichroic mirror 14, and passes through the relay system 20, in accordance with an image signal, and emits the modulated blue light component LB toward the cross dichroic prism 19. Similarly to the liquid crystal light valves 15 and 16, the liquid crystal light valve 17 includes a first polarizer 17b, a first phase plate 17a, a liquid crystal panel 17c, a second phase plate 17e, and a second polarizer 17d.

The relay system 20 includes relay lenses 24a and 24b, and reflection mirrors 25a and 25b. The relay lenses 24a and 24b are provided in order to suppress a light loss due to a long optical path of the blue light component LB. The relay lens 24a is disposed between the dichroic mirror 14 and the reflection mirror 25a. The relay lens 24b is disposed between the reflection mirrors 25a and 25b. The reflection mirror 25a is disposed so as to reflect the blue light component LB, which transmits the dichroic mirror 14 and is emitted from the relay lens 24*a*, toward the relay lens 24*b*. The reflection mirror 25*b* is disposed so as to reflect the blue light component LB emitted from the relay lens 24*b* toward the liquid crystal light valve 17.

The cross dichroic prism 19 is a color synthesis optical system in which two dichroic films 19*a* and 19*b* are disposed orthogonally in an X-shaped configuration. The dichroic film 19*a* reflects the blue light component LB and transmits the green light component LG. The dichroic film 19*b* reflects the red light component LR and transmits the green light component LG. Therefore, the cross dichroic prism 19 synthesizes the red light component LR, the green light component LG, and the blue light component LB individually modulated by the liquid crystal light valves 15 to 17, and emits synthesized light toward the projection optical system 18. The projection optical system 18 has a projection lens (not shown), and projects synthesized light from the cross dichroic prism 19 onto the screen 11.

A λ/2 phase plate may be provided in the liquid crystal light valves 15 and 17 for red and blue so as to convert the light components, which are input from the liquid crystal light valves 15 and 17 to the cross dichroic prism 19, into s-polarized light. A λ/2 phase plate may not be provided in the liquid crystal light valve 16 so as to convert the light component, which is input from the liquid crystal light valve 16 to the cross dichroic prism 19, into p-polarized light. If light incident on the cross dichroic prism 19 is converted into different kinds of polarized light, an optimum color synthesis optical system based on the reflection characteristics of the dichroic films 19*a* and 19*b* can be formed. In general, the dichroic films 19*a* and 19*b* have excellent reflection characteristics to s-polarized light. For this reason, it should suffice if, as described above, the red light component LR and the blue light component LB reflected by the dichroic films 19*a* and 19*b* are converted into s-polarized light, and the green light component LG transmitting the dichroic films 19*a* and 19*b* is converted into p-polarized light.

(Liquid Crystal Light Valve)

Next, the liquid crystal light valves (liquid crystal devices) 15 to 17 will be described.

The liquid crystal light valves 15 to 17 have the same basic configuration, except that they modulate light having different waveform regions. Therefore, a description will be provided for only the liquid crystal panel 15*c* and the liquid crystal light valve 15 having the same.

Figure 2A:
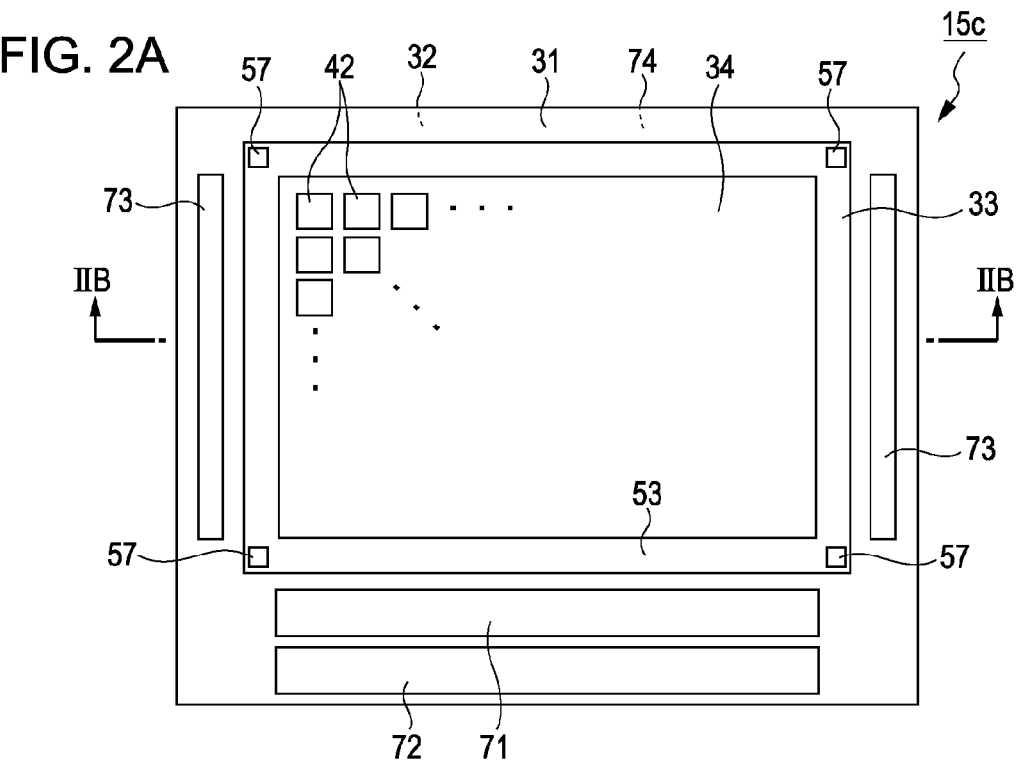
FIG. 2A is an overall configuration diagram of a liquid crystal panel according to this embodiment.
Figure 2B:
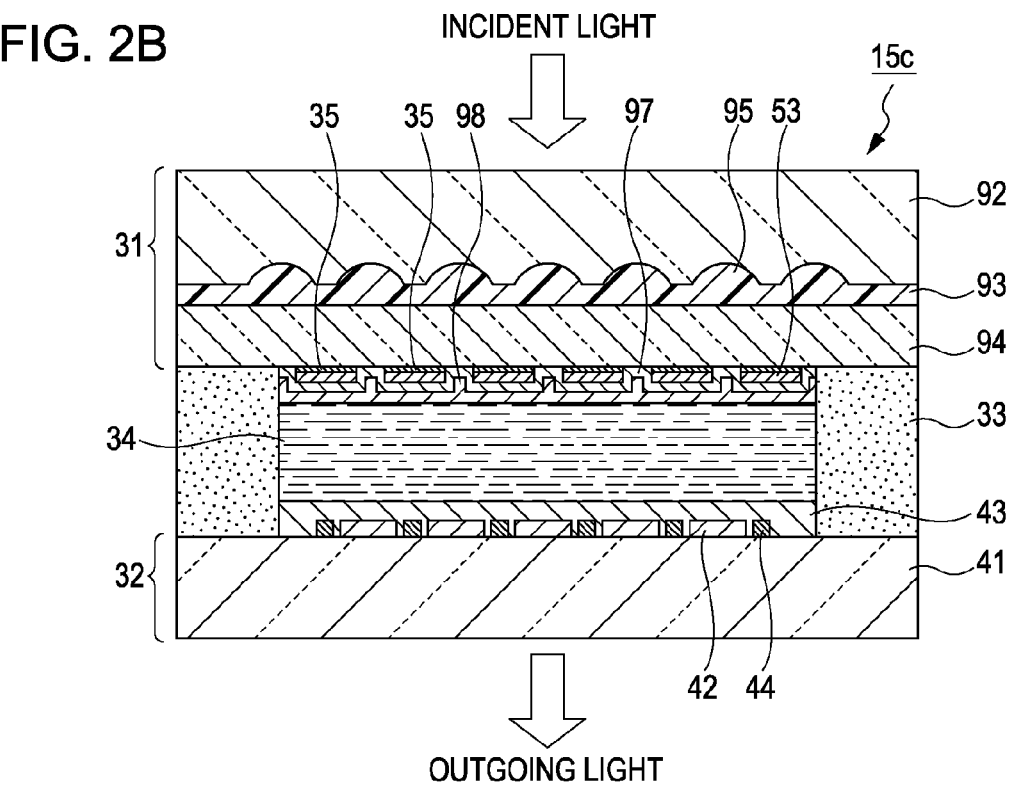
FIG. 2B is a sectional view taken along the line IIB-IIB of FIG. 2A.

FIG. 2A is an overall configuration diagram of a liquid crystal panel according to this embodiment, and FIG. 2B is a sectional view taken along the line IIB-IIB of FIG. 2A.

As shown in FIGS. 2A and 2B, the liquid crystal panel 15*c* includes a counter substrate 31 and a TFT array substrate 32 that are disposed so as to be opposite each other. The counter substrate 31 and the TFT array substrate 32 are bonded to each other by a sealant 33. A liquid crystal layer 34 is filled in a region defined by the counter substrate 31, the TFT array substrate 32, and the sealant 33.

The liquid crystal layer 34 is formed of liquid crystal having dielectric anisotropy. In the liquid crystal panel 15*c* of this embodiment, liquid crystal molecules are aligned between alignment films.

The liquid crystal panel 15*c* has the liquid crystal layer 34 filled in the region defined by the TFT array substrate 32, the counter substrate 31, and the sealant 33. In the liquid crystal panel 15*c*, a light shielding film 35 serving as a frame or a boundary is formed inward of a region where the sealant 33 is to be formed. Inter-substrate connection members 57 are individually provided at circumferential corners of the sealant 33 in order to electrically connect the TFT array substrate 32 and the counter substrate 31.

In the TFT array substrate 32, a data line driving circuit 71, an external circuit mounting terminal 72, and two scanning line driving circuits 73 are formed in a region outside the region, in which the sealant 33 is to be formed, in plan view. A plurality of wiring lines 74 for connecting the scanning line driving circuits 73 provided on both sides of the image display region are also formed in the corresponding region of the TFT array substrate 32. Instead of forming the data line driving circuit 71 and the scanning line driving circuits 73 on the TFT array substrate 32, for example, a TAB (Tape Automated Bonding) substrate having mounted thereon a driving LSI may be electrically and mechanically connected to a terminal group formed in a peripheral portion of the TFT array substrate 32, through an anisotropic conductive film.

As shown in FIG. 2B, the counter substrate 31 is a micro lens substrate (light collection substrate) having a plurality of micro lenses arranged in a plane. The counter substrate 31 primarily includes a substrate 92, a resin layer 93, and a cover glass 94.

The substrate 92 and the cover glass 94 are transparent substrates made of glass, and substrates made of silica glass, borosilicate glass, soda lime glass (blue plate glass), crown glass (white plate glass), and the like may also be used. A plurality of concave portions (micro lenses) 95 are formed on the liquid crystal layer 34 side of the substrate 92 (the bottom side of the drawing). The micro lenses 95 collect light incident on the substrate 92 from a side opposite the liquid crystal layer 34 and emits light toward the liquid crystal layer 34.

The resin layer 93 is made of a resin material filled on the micro lenses 95 of the substrate 92. The resin layer 93 is made of a light-transmissive resin material, for example, acrylic resin. The resin layer 93 is provided so as to cover one surface of the substrate 92 and to fill the concave portions of the micro lenses 95. An upper surface of the resin layer 93 is flat, and the cover glass 94 is attached to the flat surface.

The light shielding film 35, a common electrode 97, and an alignment film 98 are formed on the liquid crystal layer 34 side of a micro lens substrate 36. The light shielding film 35 is formed on the cover glass 94 in a substantially lattice shape in plan view. The micro lenses 95 are located between the light shielding film 35. The micro lenses 95 are disposed in regions overlapping the pixel regions of the liquid crystal panel 15*c* (regions where pixel electrodes 42 are to be formed) in plan view. The alignment film 98 is an alignment film that aligns the liquid crystal molecules constituting the liquid crystal layer 34 in parallel with respect to the substrate surface. For example, the alignment film 98 is made of a silicon oxide film having a columnar structure by deposition, a polyimide film on which an alignment process is performed, or the like.

The alignment film 98 is provided such that a light emitting surface thereof comes into contact with the liquid crystal layer 34. A surface of the alignment film 98 in contact with the liquid crystal layer 34 is subjected to a rubbing process in order to arrange the alignment direction of the liquid crystal molecules existing in an incident-side region of the liquid crystal layer 34 (around an interface with the alignment film 98). In general, the rubbing process is performed by rubbing the surface of the alignment film 98 with a fabric-covered roller. If the rubbing process is performed on the alignment film 98, a plurality of grooves are formed in the same direction at the surface of the alignment film 98. The alignment (or alignment state) of liquid crystal molecules in a region in contact with the alignment film 98 are regulated in a predetermined direction along the grooves formed at the surface of the alignment film 98.

The TFT array substrate 32 primarily includes a transparent substrate 41 made of glass or quartz, pixel electrodes 42 formed on the surface of the substrate 41 facing the liquid crystal layer 34, TFTs 44 for driving the pixel electrodes, and an alignment film 43.

A surface of the alignment film 43 in contact with the liquid crystal layer 34 is subjected to the same rubbing process as the alignment film 98 in order to arrange the alignment direction of liquid crystal molecules existing in an outgoing-side region of the liquid crystal layer 34 (around an interface with the alignment film 43). If the rubbing process is performed on the alignment film 43, a plurality of grooves are formed in the same direction at the surface of the alignment film 43. The alignment (or alignment state) of liquid crystal molecules in a region in contact with the alignment film 43 are regulated in a predetermined direction along the grooves formed at the surface of the alignment film 43.

The pixel electrodes 42 are, for example, a substantially rectangular conductive film made of a transparent conductive material, such as ITO, in plan view. As shown in FIG. 2A, the pixel electrodes 42 are arranged on the substrate 41 in a matrix in plan view, and are formed in regions overlapping the micro lenses 95 in plan view.

Though not shown, the TFTs 44 are formed on the substrate 41 so as to correspond to the pixel electrodes 42. Usually, the TFTs 44 are disposed in regions (non-display region, light shielding region) overlapping the light shielding film 35 on the counter substrate 31.

Similarly to the alignment film 98, the alignment film 43, which is formed so as to cover the pixel electrodes 42, is an alignment film made of a silicon oxide film or the like formed by oblique deposition.

The alignment films 43 and 98 are formed such that the alignment directions (the alignment directions of the columnar structures) are substantially orthogonal to each other in plan view. The alignment films 43 and 98 function to align the liquid crystal molecules constituting the liquid crystal layer 34 substantially in parallel with respect to the substrate surface, and to uniformize the tilt direction of the liquid crystal molecules in the substrate surface direction.

Data lines (not shown) or scanning lines (not shown) for connecting the pixel electrodes 42 or the TFTs 44 are formed in a region inside the formation region of the sealant 33 on the surface of the liquid crystal layer 34 side of the substrate 41 in plan view. The data lines and the scanning lines are formed in regions overlapping the light shielding film 35 in plan view. A region defined by the light shielding film 35 or the TFT 44, the data lines, and the scanning lines becomes the pixel region of the liquid crystal panel 15c. A plurality of pixel regions are arranged in a matrix in plan view and form the image display region.

(Phase Plate)

Figure 4:
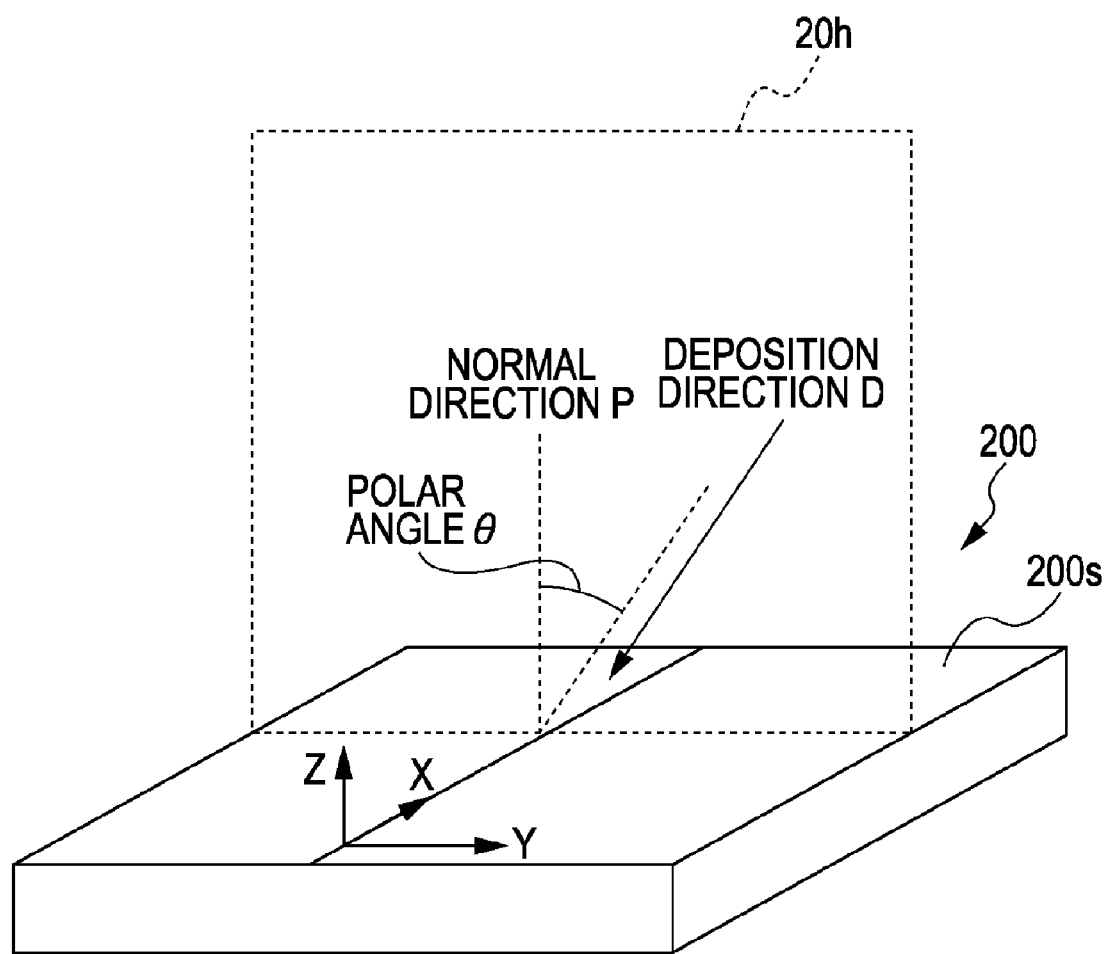
FIG. 4 is an exterior perspective view of a phase plate according to this embodiment.

Next, a phase plate according to this embodiment will be described with reference to FIGS. 3A, 3B, and 4. FIG. 3A is a plan view of a phase plate according to this embodiment, and FIG. 3B is an enlarged sectional view taken along the line IIIB-IIIB of FIG. 3A. FIG. 4 is an exterior perspective view of a phase plate according to this embodiment. In FIGS. 3A, 3B, and 4, the X direction, the Y direction, and the Z direction are the same.

As shown in FIGS. 3A and 3B, a phase plate 200, which is an example of the above-described first phase plate 15a or second phase plate 15e, according to this embodiment includes a substrate 201 made of a transparent glass substrate, and an inorganic film 204 formed on the substrate 201.

The inorganic film 204 is formed on the substrate 201 by depositing an inorganic material, such as $Ta_2O_5$, on the substrate 201 from a deposition direction D, which is oblique with respect to the substrate 201.

As shown in FIG. 3B, the inorganic film 204 has a film structure including a portion, in which an inorganic material is grown along the deposition direction D and a columnar structure is formed, as viewed microscopically. The inorganic film having such a structure produces a phase difference to a greater or lesser due to the fine structure. The inorganic film 204 of the phase plate 200 has a columnar portion 204a that extends from the substrate 201 along the deposition direction D of the inorganic material in sectional view, as viewed microscopically.

As shown in FIG. 4, a polar angle (which is used to define a measurement direction for measuring the phase difference of light is an angle with respect to the normal direction P of the substrate surface 200s. Typically, the polar angle is an angle of a visual axis when the direct view of the phase plate is set to 0(. In this embodiment, the polar angle (from the normal direction P toward the deposition direction D is defined as minus, and the polar angle (in a reverse direction is defined as plus. For simplification of explanation, an azimuth direction of the measurement direction for measuring the phase difference of light, that is, an in-surface direction within the substrate surface 200s is arranged to a direction in which the deposition direction D is projected onto the substrate surface 200s, in other words, the Y direction. Typically, the deposition angle D and the polar angle (may be in the same plane. Therefore, when the deposition angle and the polar angle are set to be identical, the degree of improvement of contrast in the liquid crystal device can be grasped in accordance with the phase difference of the inorganic material itself.

(Quantitative Analysis of Contrast Improvement According to Front Phase Difference, Deposition Angle, and Ratio of Phase Difference in Phase Plate)

Figure 6A:
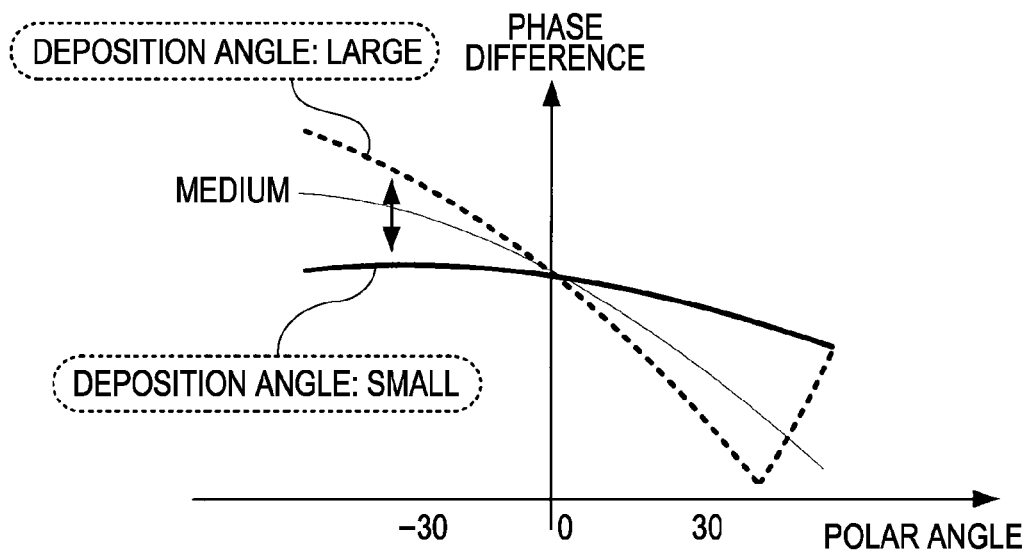
FIG. 6A is a graph showing the quantitative correlationship between a phase difference, a polar angle, and a deposition angle in a phase plate according to this embodiment when a thickness in a phase plate is identical.
Figure 6B:
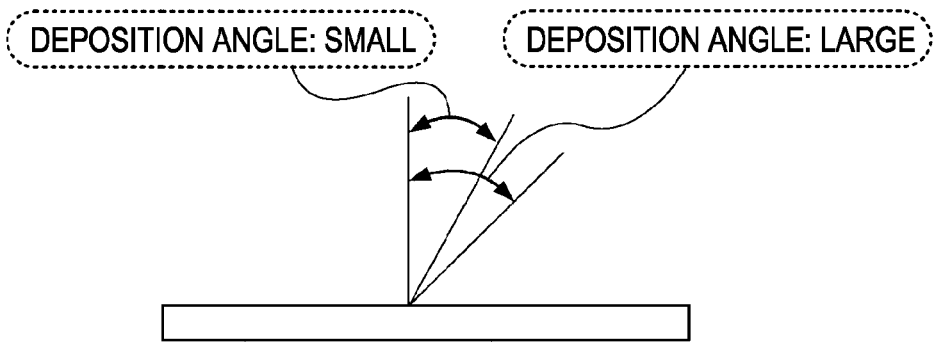
FIG. 6B is a schematic view showing the magnitude relation of a deposition angle according to this embodiment.
Figure 6C:
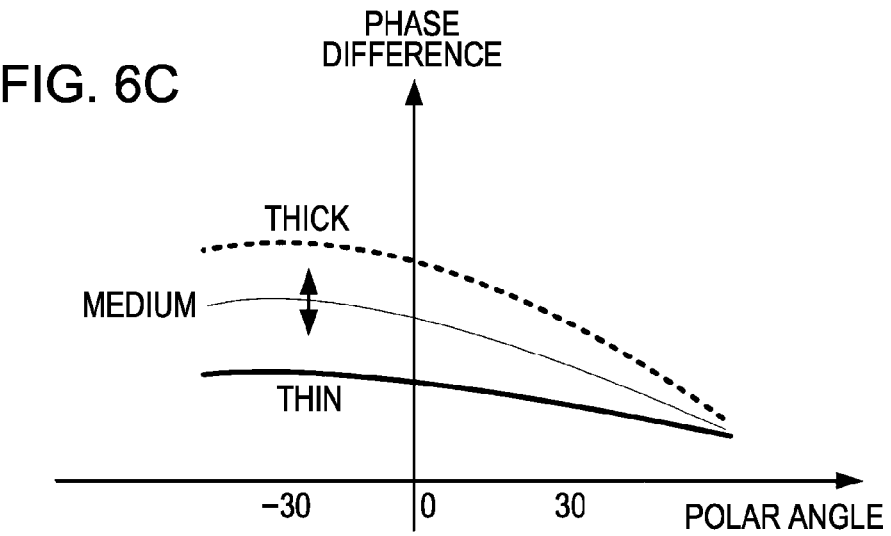
FIG. 6C is a graph showing the quantitative correlationship between a phase difference, a polar angle, and a thickness in a phase plate according to this embodiment when a deposition angle is identical.

Next, the quantitative analysis of contrast improvement according to a front phase difference, a deposition angle, and a ratio of a phase difference in a phase plate according to this embodiment will be described with FIGS. 5A to 5J, FIGS. 6A to 6C, FIGS. 7A to 7D, and FIG. 8. FIGS. 5A to 5J are tables showing the quantitative correlationship between a front phase difference, a deposition angle, and a ratio of a phase difference of a phase plate according to this embodiment. In FIGS. 5A to 5J, the front phase difference is in a range of 10 (nm: nanometer) to 100 (nm). FIG. 6A is a graph showing the quantitative correlationship between a phase difference, a polar angle, and a deposition angle when a thickness is identical in a phase plate according to this embodiment. FIG. 6B is a schematic view showing the magnitude relation of a deposition angle according to this embodiment. FIG. 6C is a graph showing the quantitative correlationship between a phase difference, a polar angle, and a thickness of a phase plate when a deposition angle is identical in a phase plate according to this embodiment. In FIGS. 6A and 6C, the horizontal axis represents a polar angle, and the vertical axis represents a phase difference.

First, for the quantitative analysis of contrast improvement according to a front phase difference, a deposition angle, and a ratio of a phase difference in a phase plate according to this embodiment, 50 (=5×10) phase plates shown in FIGS. 5A to 5J are prepared. Specifically, the 50 phase plates are defined by the following three variables. The three variables include a front phase difference Ret(0), a magnitude level of a deposition angle, and a ratio type and the value of a corresponding ratio. In this embodiment, the ratio type means the type of a ratio between two phase differences with a polar angle as a variable. Four ratio types are individually defined by the following four equations.

A first ratio type R[a] is defined by Equation (1).

$$R[a]=Ret(-30)/Ret(0) \quad (1)$$

Here, Ret(−30) means a phase difference when the polar angle is "−30°". Ret(0) means a phase difference when the polar angle is "0°", that is, a front phase difference.

A second ratio type R[b] is defined by Equation (2).

$$R[b]=Ret(30)/Ret(0) \quad (2)$$

Here, Ret(30) means a phase difference when the polar angle is "30°".

A third ratio type R[c] is defined by Equation (3).

$$R[c]=Ret(-30)/Ret(30) \quad (3)$$

Here, Ret(−30) means a phase difference when the polar angle is "−30°".

A fourth ratio type R[d] is defined by Equation (4).

$$R[d]=Ret(30)/Ret(-30) \quad (4)$$

Specifically, as shown in FIGS. 5A to 5J, for convenience, the 50 phase plates 1a to 50a are represented as follows. The magnitude level of the deposition angle (hereinafter, referred to as a deposition angle level) means that as the level value increases, the deposition angle is large.

(phase plate 1a: front phase difference, deposition angle level, R[a], R[b], R[c], R[d])=(phase plate 1a: 10, 5, 1.6, 0.1, 11.8, 0.1)

(phase plate 2a: front phase difference, deposition angle level, R[a], R[b], R[c], R[d])=(phase plate 2a: 10, 4, 1.4, 0.3, 4.4, 0.2)

(phase plate 3a: front phase difference, deposition angle level, R[a], R[b], R[c], R[d])=(phase plate 3a: 10, 3, 1.3, 0.4, 2.9, 0.3)

. . .

(phase plate 49a: front phase difference, deposition angle level, R[a], R[b], R[c], R[d])=(phase plate 49a: 100, 2, 1.2, 0.6, 2.0, 0.5)

(phase plate 50a: front phase difference, deposition angle level, R[a], R[b], R[c], R[d])=(phase plate 50a: 100, 1, 1.1, 0.7, 1.5, 0.7)

(Phase Plate 6a to 10a)

More specifically, the first ratio type R[a] in the phase plates 6a to 10a of FIG. 5B is taken into consideration. First, the phase plate 6a having the maximum magnitude level of the deposition angle is expressed as follows.

(phase plate 6a: front phase difference, deposition angle level, R[a], R[b], R[c], R[d])=(phase plate 6a: 20, 5, 1.6, 0.1, 11.8, 0.1)

Therefore, the front phase difference Ret(0) is 20 (nm), and if R[a]=1.6 and Ret(0)=20 (nm) are substituted into Equation (1), the following value is obtained.

$$Ret(-30)=32 \text{ (nm)}$$

The phase plate 10a having the minimum magnitude level of the deposition angle is expressed as follows.

(phase plate 10a: front phase difference, deposition angle level, R[a], R[b], R[c], R[d])=(phase plate 10a: 20, 1, 1.1, 0.7, 1.5, 0.7)

Therefore, the front phase difference Ret(0) is 20 (nm), and if R[a]=1.1 and Ret(0)=20 (nm) are substituted into Equation (1), the following value is obtained.

$$Ret(-30)=22 \text{ (nm)}$$

Focusing on the phase plates having the same front phase difference, such as the phase plate 6a, the phase plate 10a, and the like, it can be seen that when the deposition angle level of the inorganic material decreases from the maximum value to the minimum value, the phase difference Ret(−30), that is, the phase difference when the polar angle is "−30°" also decreases. Specifically, the inventors have studied and found that, as shown in FIG. 6A, when the thickness in the phase plate is identical, as the deposition angle increases, the variation of the phase difference per angle of a predetermined polar angle increases. In other words, it has been found that when the phase plates have the same thickness, as the deposition angle from the normal direction of the substrate increases, the variation of the phase difference per angle of a predetermined polar angle increases. Specifically, a dotted line corresponds to a case in which the deposition angle is comparatively large, and a bold line corresponds to a case in which the deposition angle is comparatively small. Referring to FIG. 6B, the deposition angle in FIG. 6A means an angle from the normal direction of the substrate. It has also been found that when the thickness in the phase plate is identical, the phase difference when the polar angle is 0° is substantially identical, regardless of the magnitude of the deposition angle.

The inventors have studied and found that, as shown in FIG. 6C, if the deposition angle is identical, as the thickness of the phase plate increases, the phase difference increases within a range of the polar angle including 0°. Specifically, a dotted line corresponds to a case in which the thickness of the phase plate is comparatively large, and a bold line corresponds to a case in which the thickness of the phase plate is comparatively small. It has also been found that when the deposition angle in the phase plate is identical, the phase difference when the polar angle is identical to the deposition angle is substantially identical, regardless of the thickness of the phase plate.

Next, the quantitative correlationship between a ratio of two phase differences and contrast with a front phase difference and a polar angle as variables in a phase plate according to this embodiment will be described with reference to FIGS. 5A to 5J and FIGS. 7A to 7D. FIGS. 7A to 7D are graphs showing the quantitative correlationship between a ratio of two phase differences and contrast with a front phase difference and a polar angle as variables in a phase plate according to this embodiment. FIGS. 7A to 7D correspond to the first ratio type R[a] to the fourth ratio type R[d]. In FIGS. 7A to 7D, a plurality of solid circles correspond to a plurality of phase plates that can increase contrast so as to be larger than a predetermined value. In FIGS. 7A to 7D, contour lines represent the contrast value, and in particular, the contour lines inside the bold contour line represent that the contrast value is larger than a predetermined value.

Figure 7A:
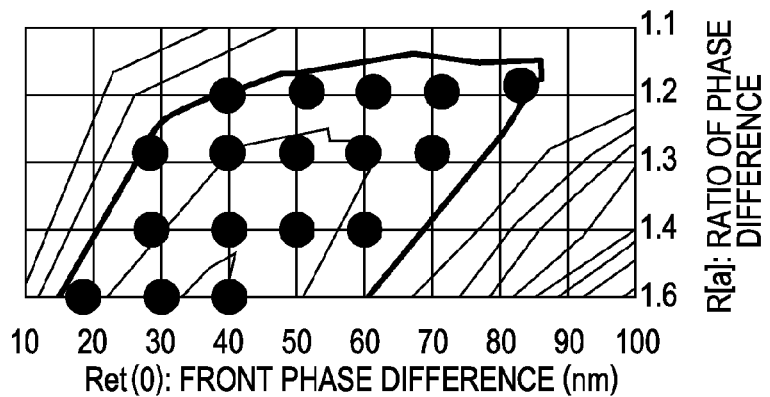
FIGS. 7A to 7D are graphs showing the quantitative correlationship between a ratio of two phase differences and contrast with a front phase difference and a polar angle as variables in a phase plate according to this embodiment.
Figure 7B:
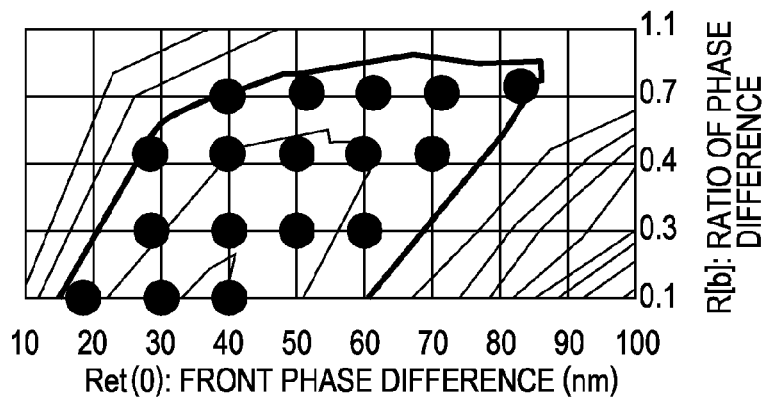
Figure 7C:
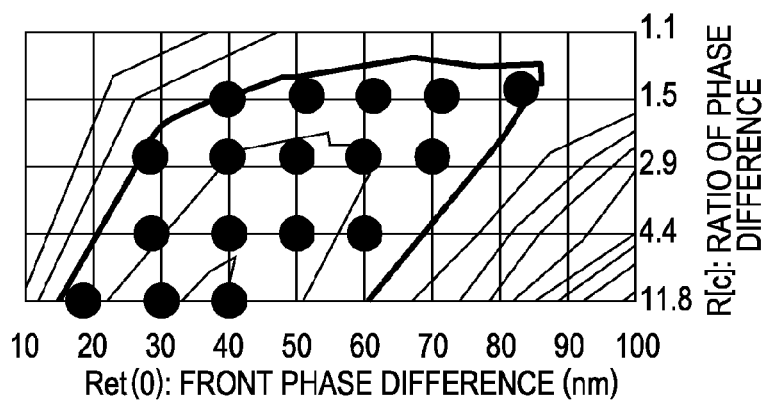
Figure 7D:
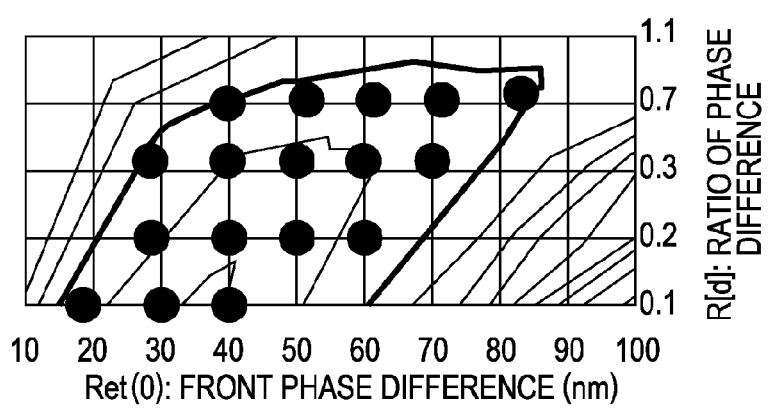

As shown in FIG. 7A, when the front phase difference Ret(0) is 20 (nm), if the value of the first ratio type R[a] is set to "1.6", the contrast can be increased so as to be larger than a predetermined value. In other words, as shown in FIG. 7B, when the front phase difference Ret(0) is 20 (nm), if the value of the second ratio type R[b] is "0.1", the contrast can be increased so as to be larger than a predetermined value. As shown in FIG. 7C, when the front phase difference Ret(0) is 20 (nm), if the value of the third ratio type R[c] is set to "11.8", the contrast can be increased so as to be larger than a predetermined value. As shown in FIG. 7D, when the front phase difference Ret(0) is 20 (nm), if the value of the fourth ratio type R[d] is set to "0.1", the contrast can be increased so as to be larger than a predetermined value.

As a result, when the front phase difference Ret(0) is set to 20 (nm), the contrast can be improved by the phase plate 6*a*. (Phase Plate 11*a* to 15*a*)

Next, the first ratio type R[a] in the phase plates 11*a* to 15*a* of FIG. 5C is taken into consideration. First, the phase plate 11*a* having the maximum magnitude level of the deposition angle is expressed as follows.

(phase plate 11*a*: front phase difference, deposition angle level, R[a], R[b], R[c], R[d])=(phase plate 11*a*: 30, 5, 1.6, 0.1, 11.8, 0.1)

Therefore, the front phase difference Ret(0) is 30 (nm), and if R[a]=1.6 and Ret(0)=30 (nm) are substituted into Equation (1), the following value is obtained.

$$Ret(-30)=48 \text{ (nm)}$$

The same is applied to the phase plate 12*a*, the phase plate 13*a*, and the phase plate 14*a*.

Meanwhile, the phase plate 15*a* having the minimum magnitude level of the deposition angle is expressed as follows.

(phase plate 15*a*: front phase difference, deposition angle level, R[a], R[b], R[c], R[d])=(phase plate 15*a*: 30, 1, 1.1, 0.7, 1.5, 0.7)

Therefore, the front phase difference Ret(0) is 30 (nm), and if R[a]=1.1 and Ret(0)=30 (nm) are substituted into Equation (1), the following value is obtained.

$$Ret(-30)=33 \text{ (nm)}$$

In particular, as shown in FIG. 6C, the value of the front phase difference may be adjusted by changing the thickness of the phase plate.

As shown in FIG. 7A, when the front phase difference Ret(0) is 30 (nm), if the value of the first ratio type R[a] is set to be in a range of "about 1.3" to "about 1.6", the contrast can be increased so as to be larger than a predetermined value. In other words, as shown in FIG. 7B, when the front phase difference Ret(0) is 30 (nm), if the value of the second ratio type R[b] is set to be in a range of "about 0.1" to "about 0.4", the contrast can be increased so as to be larger than a predetermined value. As shown in FIG. 7C, when the front phase difference Ret(0) is 30 (nm), the value of the third ratio type R[c] is set to be in a range of "about 11.8" to "about 2.9", the contrast can be increased so as to be larger than a predetermined value. As shown in FIG. 7D, when the front phase difference Ret(0) is 30 (nm), if the value of the fourth ratio type R[d] is set to be in a range of "about 0.1" to "about 0.3", the contrast can be increased so as to be larger than a predetermined value.

As a result, when the front phase difference Ret(0) is set to 30 (nm), the contrast can be improved by the phase plates 11*a*, 12*a*, and 13*a*.

In other words, when the front phase difference Ret(0) is 30 (nm), in the phase plate, which can achieve the contrast larger than a predetermined value, the value of the first ratio type R[a] is in a range of "about 1.3" to "about 1.6", and thus it can be seen that the allowable range of the first ratio type R[a] is extended, as compared with a case in which the value of the first ratio type R[a] is "about 1.6" when the front phase difference Ret(0) is 20 (nm). In other words, when the front phase difference Ret(0) is 30 (nm), in the phase plate, which can achieve the contrast larger than a predetermined value, it can be seen that the allowable range of the deposition angle of the inorganic material is extended, as compared with the front phase difference Ret(0) is 20 (nm). It can be seen that the same is substantially applied to the second ratio type R[b], the third ratio type R[c], and the fourth ratio type R[d].

As a result, a phase plate capable of improving the contrast can be simply implemented by appropriately changing the value of the front phase difference, the values of the first to fourth ratio types R[a] to R[d], and the value of the deposition angle.

(Values of First to Fourth Ratio Types R[a] to R[d] Corresponding to Front Phase Difference)

The correlationship between the front phase difference and the values of the first to fourth ratio types R[a] to R[d] corresponding to the front phase difference in a phase plate according to this embodiment, which can improve the contrast so as to be larger than a predetermined value, will be described with reference to FIG. 8. FIG. 8 is a table showing the correlationship between the front phase difference and the values of the first to fourth ratio types R[a] to R[d] corresponding to the front phase difference in a phase plate according to this embodiment, which can improve the contrast so as to be larger than a predetermined value.

As shown in FIG. 8, in a phase plate, which can improve the contrast so as to be larger than a predetermined value, when the front phase difference is set to 20 (nm), the value of the first ratio type R[a] is "1.6", the value of the second ratio type R[b] is "0.1", the value of the third ratio type R[c] is "11.8", and the value of the fourth ratio type R[d] is "0.1". As shown in FIG. 8, in a phase plate, which can improve the contrast so as to be larger than a predetermined value, when the front phase difference is set to 30 (nm), the value of the first ratio type R[a] is in a range of "1.3 to 1.6", the value of the second ratio type R[b] is in a range of "0.1 to 0.4", the value of the third ratio type R[c] is in a range of "2.9 to 11.8", and the value of the fourth ratio type R[d] is in a range of "0.1 to 0.3". Similarly, in a phase plate, which can improve the contrast so as to be larger than a predetermined value, when the front phase difference is set to 80 (nm), the value of the first ratio type R[a] is "1.2", the value of the second ratio type R[b] is "0.6", the value of the third ratio type R[c] is "2.0", and the value of the fourth ratio type R[d] is "0.5". These results correspond to a numerical value group X20 to a numerical value group X80 in FIGS. 5A to 5J.

In particular, as shown in FIG. 8, in a phase plate, which can improve the contrast so as to be larger than a predetermined value, the allowable range of the first ratio type R[a] is in a range of "1.2 to 1.6". In contrast, in a phase plate, which can improve the contrast so as to be larger than a predetermined value, the allowable range of the third ratio type R[c] is in a range of "2.0 to 11.8" and is larger than the allowable range of the first ratio type R[a], that is, "1.2 to 1.6". This is also represented from the fact that in a numerical value group X40 of FIG. 5D, the allowable range of the third ratio type R[c] is in a range of "2.0 to 11.8". Therefore, in a manufacturing process of a phase plate, which can improve the contrast so as to be larger than a predetermined value, the third ratio type R[c] can be used as a parameter for the criterion of quality management, and thus the allowable range can be set larger than the first ratio type R[a]. As a result, if the third ratio type R[c] is used, a phase plate, which can improve the contrast so as to be larger than a predetermined value, can be simply manufactured for quality management.

(Contrast Measurement Method)

Figure 9:
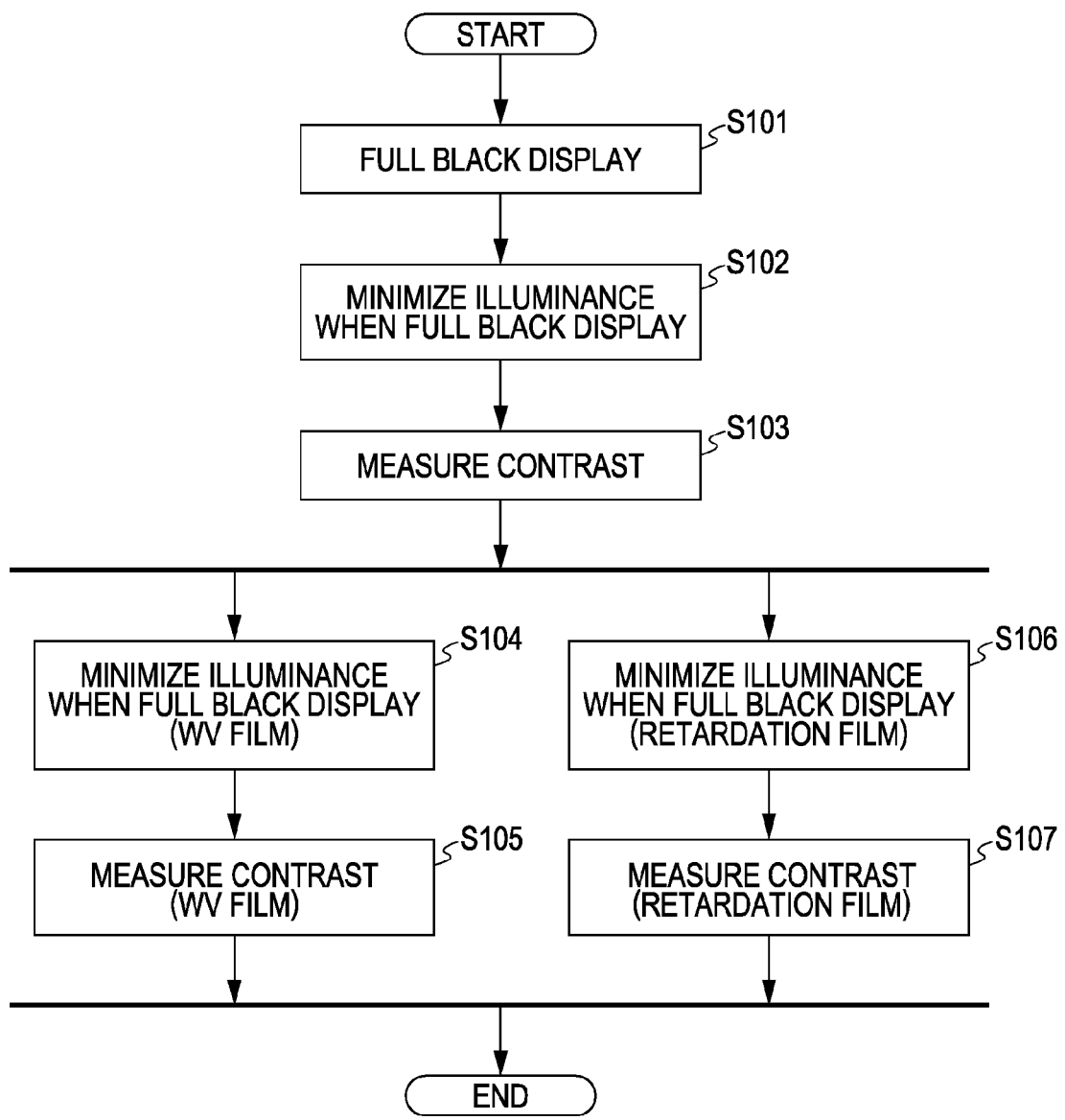
FIG. 9 is a flowchart showing a flow of a contrast measurement method according to this embodiment.

Next, a contrast measurement method according to this embodiment will be described with reference to FIG. 9. FIG. 9 is a flowchart showing a flow of a contrast measurement method according to this embodiment. It is assumed that contrast measurement is performed by using the liquid crystal light valve 15.

First, a voltage of 5V is applied to the liquid crystal panel 15*c*, thereby performing full black display on a projection screen (Step S101).

Next, the incident-side polarizer of the liquid crystal panel 15*c* is rotated, and adjustment is executed such that the illumination during full black display has a minimum value (Step S102).

Next, the contrast of the liquid crystal panel 15*c* is measured (Step S103).

Next, one wide view film, instead of the first phase plate 15*a*, is disposed at a position where the first phase plate 15*a* is to be disposed, and the other wide view film, instead of the second phase plate 15*e*, is disposed at a position where the second phase plate 15*e* is to be disposed. Thereafter, while one wide view is being rotated, adjustment is executed such that the illumination during full black display has a minimum value (Step S104).

Next, the contrast of the liquid crystal panel 15*c* when one wide view film and the other wide view film are disposed is measured (Step S105).

Next, the first phase plate 15*a* is disposed at a position where the first phase plate 15*a* is to be disposed, and the second phase plate 15*e* is disposed at a position where the second phase plate 15*e* is to be disposed. Thereafter, while the first phase plate 15*a* is being rotated, adjustment is executed such that the illumination during full black display has a minimum value (Step S106).

Next, the contrast of the liquid crystal panel 15*c* when the first phase plate 15*a* and the second phase plate 15*e* are disposed is measured (Step S106).

(Electronic Apparatus: Projector)

Figure 10:
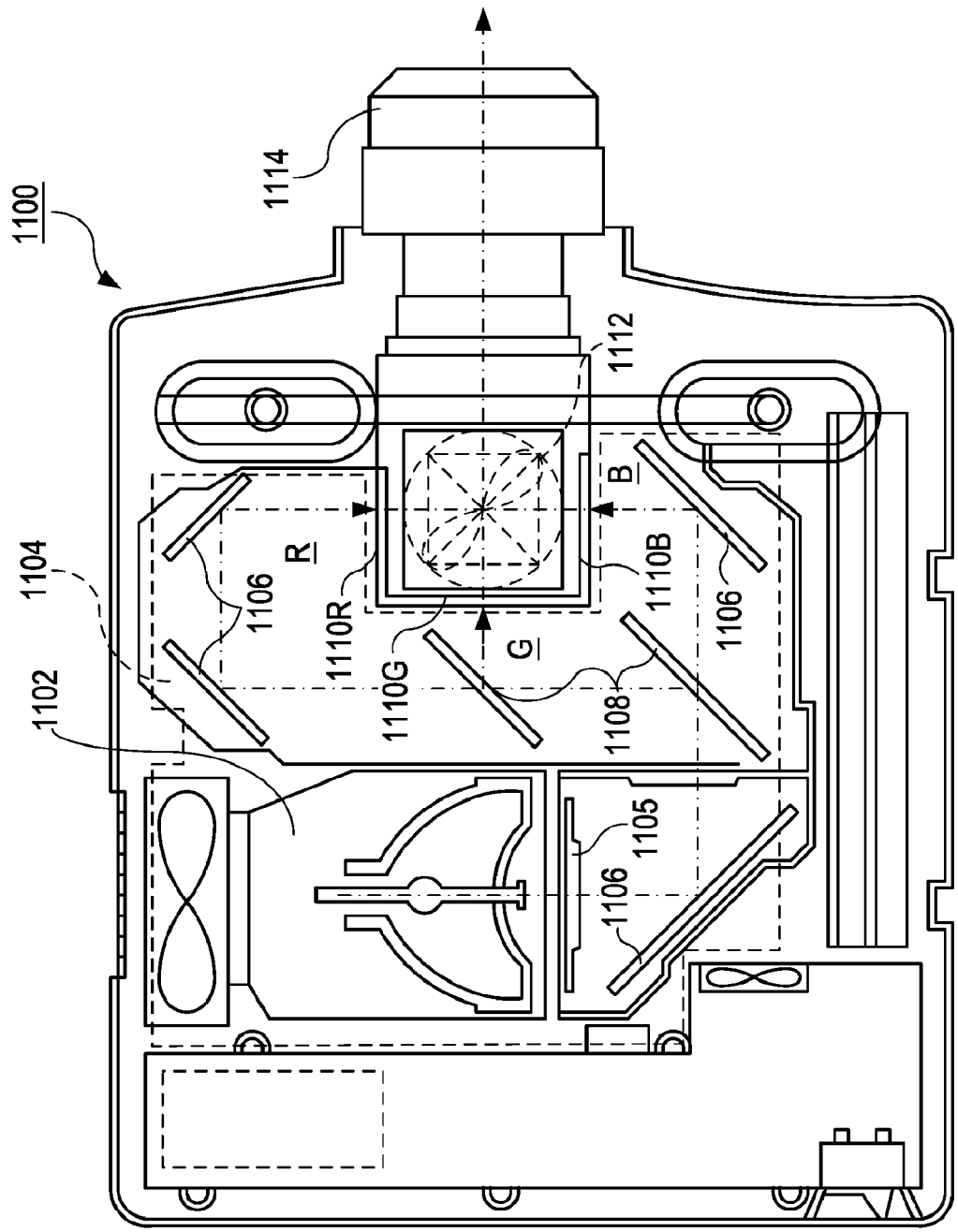
FIG. 10 is a plan view showing an example of the configuration of a projector according to this embodiment.

The specific configuration of an electronic apparatus according to this embodiment will be described with reference to FIG. 10. In the following description, as an example of an electronic apparatus according to this embodiment, a projector that uses an electro-optical device, that is, the above-described liquid crystal device as a liquid crystal light valve will be described. FIG. 10 is a plan view showing an example of the configuration of a projector according to this embodiment. In the following description, the above-described constituent elements will be appropriately omitted.

As shown in FIG. 10, a projector 1100 is provided with a lamp unit 1102 including a white light source, such as a halogen lamp. Projection light emitted from the lamp unit 1102 first has an appropriate amount of light by a stop 1105. Thereafter, projection light is separated into light components of three primary colors of RGB by four mirrors 1106 and two dichroic mirrors 1108, which are disposed in a light guide 1104, and the light components are incident on liquid crystal panels 1110R, 1110B, and 1110G, which serve as light valves corresponding to the colors.

The liquid crystal panels 1110R, 1110B, and 1110G have the same configuration as the above-described liquid crystal device, and are driven by color signals of R, G, and B, which are supplied from an image signal processing circuit. The light components modulated by the liquid crystal panels are incident on a dichroic prism 1112 from three directions. In the dichroic prism 1112, the R and B light components are refracted at 90°, and the G light component goes straight. Therefore, the images of the respective colors are synthesized, and as a result, a color image is projected onto a screen through a projection lens 1114.

Focusing on the display images by the liquid crystal panels 1110R, 1110B, and 1110G, the display image by the liquid crystal panel 1110G needs to be left-right inverted with respect to the display images by the liquid crystal panels 1110R and 1110B.

The light components corresponding to R, G, B colors are incident on the liquid crystal panels 1110R, 1110B, and 1110G through the dichroic mirror 1108, and thus no color filters are provided.

In addition to the electronic apparatus described with reference to FIG. 10, a mobile personal computer, a mobile phone, a liquid crystal television, a view-finder-type or a monitor-direct-view-type video tape recorder, a car navigation system, a pager, an electronic organizer, an electronic calculator, a word processor, a workstation, a video phone, a POS terminal, and an apparatus including a touch panel may be exemplified. Of course, the invention can be applied to these electronic apparatuses.

The invention is not limited to the foregoing embodiment, and various modifications may be made to the invention without departing from the spirit and scope of the invention that can be understood from the appended claims and the entire specification. A liquid crystal device, which includes a polarizer and a phase plate, and involves such modifications, a projector including a liquid crystal device, and a phase plate for a liquid crystal device also fall within the technical scope of the invention.

What is claimed is:

1. A liquid crystal device comprising:
   a liquid crystal panel that has a pair of substrates with liquid crystal interposed therebetween and that modulates light;
   a pair of polarizers that are disposed with the liquid crystal panel interposed therebetween; and
   a phase plate including:
      a substrate disposed between the a pair of polarizers;
      an inorganic film formed on the substrate, the inorganic film being formed by a supply direction of an inorganic material to the substrate surface set such that a ratio of a front phase difference, which is produced when light is incident along a normal direction of the phase plate, and a first phase difference, which is produced when light is incident along a first direction different from the normal direction, falls within a predetermined range.

2. A liquid crystal device comprising:
   a liquid crystal panel that has a pair of substrates with liquid crystal interposed therebetween and that modulates light;
   a pair of polarizers that are disposed with the liquid crystal panel interposed therebetween; and
   a phase plate including:
      a substrate disposed between the a pair of polarizers;
      an inorganic film formed on the substrate, the inorganic film being formed by a supply direction of an inorganic material to the substrate surface set such that a ratio of a first phase difference, which is produced when light is incident along a first direction different from a normal direction of the phase plate, and a second phase difference, which is produced when light is incident along a second direction symmetric with respect to the first direction on the basis of the normal direction, falls within a predetermined range.

3. The liquid crystal device according to claim 1,
   wherein the first direction and the supply direction of the inorganic material are present on the same plane.

4. The liquid crystal device according to claim 1,
   wherein the predetermined range is determined in accordance with the front phase difference, which is produced when light is incident along the normal direction of the phase plate.

5. The liquid crystal device according to claim 1,
   wherein the phase plate is provided so as to be rotatable around the normal direction.

6. A projector comprising:
   the liquid crystal device according to claim 1;
   a light source that emits light; and
   a projection optical system that projects modulated light.

* * * * *